United States Patent [19]

Nadeau, Jr. et al.

[11] Patent Number: 4,556,382
[45] Date of Patent: Dec. 3, 1985

[54] DIE ASSEMBLY FOR TIRE TREAD EXTRUDATE

[75] Inventors: John F. Nadeau, Jr., Mogadore; Alexander J. Varvaro, Akron, both of Ohio

[73] Assignee: The Firestone Tire & Rubber Company, Akron, Ohio

[21] Appl. No.: 659,801

[22] Filed: Oct. 11, 1984

[51] Int. Cl.⁴ ............................................. B29F 3/10
[52] U.S. Cl. ................................. 425/462; 425/325; 425/377; 425/467; 156/244.11
[58] Field of Search ................ 425/131.1, 462, 463, 425/467; 156/244.11, 244.22; 264/171, 177 R

[56] References Cited
U.S. PATENT DOCUMENTS

| | | |
|---|---|---|
| 2,569,373 | 10/1951 | Fay . |
| 3,584,343 | 6/1971 | Kohlepp et al. . |
| 3,640,659 | 2/1972 | Dimitroff .......................... 425/463 X |
| 3,870,453 | 3/1975 | Howard . |
| 3,877,857 | 4/1975 | Melead . |
| 3,941,551 | 3/1976 | Marion . |
| 4,076,568 | 2/1978 | Kubiat et al. ............... 156/244.11 X |
| 4,093,414 | 6/1978 | Swiatovy ......................... 425/462 X |
| 4,100,237 | 7/1978 | Wiley ........................... 156/244.11 X |
| 4,329,133 | 5/1982 | Gallizia . |
| 4,379,806 | 4/1983 | Korpman .................... 156/244.11 X |
| 4,432,826 | 2/1984 | Searberry et al. ............. 156/244.11 |

Primary Examiner—J. Howard Flint, Jr.
Attorney, Agent, or Firm—Ernst H. Ruf

[57] ABSTRACT

A die assembly for generating a green tread extrudate for pneumatic tire fabrication is presented. Fundamentally, the invention includes a preform die of fixed configuration, having passages and openings therein for passing both a base stock material and a cap stock material. The openings are separated by a partition. Upper and lower final die plates are then formed to communicate with the openings, one for the cap stock, and the other for the base stock. The configuration of the die portion of the die plates control not only the external geometry of the resulting extrudate, but also the geometry of the junction between the cap stock and the base stock in the extrudate. The invention accommodates a broad range of tire specifications with the simple change of die plates.

8 Claims, 9 Drawing Figures

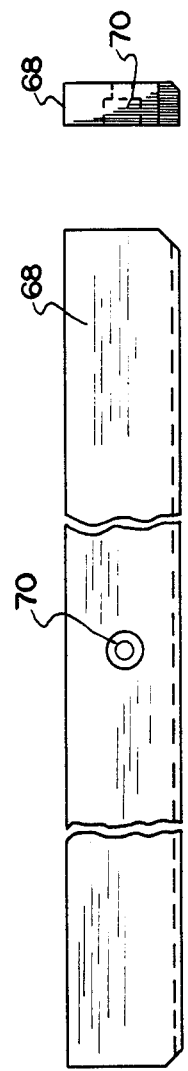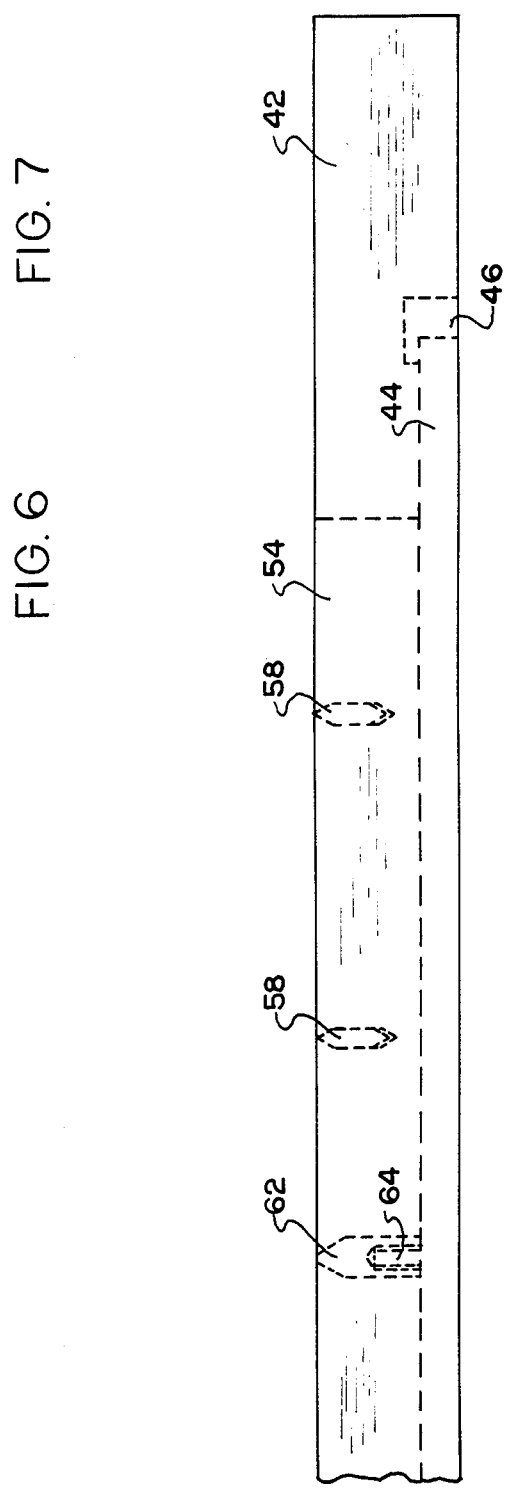

DIE ASSEMBLY FOR TIRE TREAD EXTRUDATE

TECHNICAL FIELD

The invention herein resides in the art of pneumatic tire fabrication. More specifically, the invention relates to an apparatus and technique for extruding the green tire tread extrudate for application to the tire body, particularly such extrudates formed by joining two different stocks of material.

BACKGROUND ART

Presently, in the fabrication of pneumatic tires it is known that a green tread extrudate is "stitched" to the tire body for the formation of a tread thereon during the curing operation. With reference to FIG. 1, it can be seen that a typical green tread extrudate, as presently known, is designated in cross-section by the numeral 10. The extrudate 10 includes a base stock material 12, typically of rubber composition, adapted to be adhered to the tire body upon curing. A cap stock 14, of a different rubber composition, is adhered to the top of the base stock 12 as shown. As is well known in the art, the tire tread is formed in the cap stock 14 in standard fashion.

The specific configuration of the extrudate 10, as well as the nature and configurations of the base stock 12 and cap stock 14 are dictated by the tire specifications on which the extrudate 10 is to be used. Parameters such as tire diameter, width, and tread design all dictate the design criteria for the extrudate 10 and the constituent layers 12,14. Not only is the overall geometry of the extrudate 10 important, but it has been found that the junction 16 between the cap stock 14 and base stock 12 is equally important, if not more so. As shown in FIG. 1, this junction angles upwardly at each end of the extrudate 10 as designated by the numeral 18. These areas, which correspond to the shoulder of the tire, are characterized by a thinning of the cap stock 14 and a thickening of the base stock 12. The relative thicknesses of the layers 12,14 at various points in the extrudate 10, and the degree and length of the angle portions 18 is of great significance in tire fabrication and is dependent upon the specifications accorded the resulting tire. Since a large variety of tire specifications are now known, the capability of effectively, reliably, and economically controlling the extrudate geometry is paramount.

As shown in FIG. 2, the prior art has taught that the extrudate of FIG. 1 may be made utilizing a die assembly designated generally by the numeral 20. Such a die assembly would typically include a preform die 22 having various openings and passages machined therein dependent upon the desired nature of the extrudate to be formed. An opening and passage 24 would be machined in the preform die 22 and would communicate with a suitable conduit for passing the cap stock material therethrough. In like fashion, an opening and passage 26 would be formed in the preform die 22 and communicate with a suitable conduit for passing the base stock material. Side extrusion openings and passages 28,30 are similarly machined to obtain the desired geometry of the resulting extrudate 10. As can be seen, the side extrusion openings 28,30 are machined such as to seek to obtain a desired geometry of the junction between the layers 12,14. Of course, to obtain the approach angle as at 18, the passages and openings 28,30 must be carefully designed and machined.

A final die 32 is secured to the housing 22 by means of screws 34 or other appropriate fasteners. While the final die 32 is only illustratively shown in FIG. 2, it will be understood that the die 32 communicates with the openings and passages 24-30 to form the final extrudate 10. However, the die portion of the final die 32 is configured to be substantially identical to the external geometry of the extrudate 10, to only define such external geometry, and not to define the junction 16 between the base stock 12 and the cap stock 14. Typically, the final die 32 only defines the upper geometry of the cap stock 14. Again, the junction 16 is defined by the machining of the passages and openings 24-30 in the housing 22. Accordingly, to provide green tire tread extrudates for a wide variety of tire specifications, a large number of preform dies 20 have been found to be necessary. As will be readily appreciated, the generation of each of the preform dies 20 is both expensive and time consuming, requiring extensive operations by machinists and other skilled tradesmen.

A number of prior art teachings are also known which teach or suggest techniques and apparatus for use in extruding pneumatic tire tread composites. U.S. Pat. No. 2,569,373 presents a die head for generating a multilayered extrusion for use in forming pneumatic tire treads. However, the structure presented therein fails to keep the base stock and cap stock separated until entering the final die. U.S. Pat. No. 3,941,551 teaches coextruding of layers of material and includes an adjustment feature whereby the profile of the outlet slots of the extruder may be adjusted while the machine is in operation. However, it is believed that such an apparatus is readily given to loss of adjustment during operation. U.S. Pat. No. 3,584,343 teaches a rubber extrusion head having a paired pre-template and finish template, but does not teach the utilization or control of separate base and cap stocks.

Of general interest, applicants are aware of U.S. Pat. Nos. 3,870,453 and 3,877,857. These patents teach an extruder structured to control the gauge, but not the contour, of an extrudate. In somewhat similar fashion, U.S. Pat. No. 4,329,133 presents an extruder head utilizing knives to control relative thicknesses of the extruded material.

SUMMARY OF THE INVENTION

In light of the foregoing, it is an object of a first aspect of the invention to provide a die assembly for tire tread extrudates which is readily adaptable to accommodate a broad range of tire specifications.

Another aspect of the invention is the provision of a die assembly for tire tread extrudates which controls the entire geometric configuration of both the cap stock and the base stock material.

A further aspect of the invention is the provision of a die assembly for tire tread extrudates which utilizes two die plates, one for the cap stock and one for the base stock, thereby controlling the geometry of the junction between the two stocks, as well as the final overall configuration.

Still an additional aspect of the invention is the provision of a die assembly for tire tread extrudates which may be easily modified to accommodate new tire designs with a minimum of effort and cost.

Yet another aspect of the invention is the provision of a die assembly for tire tread extrudates which is readily adapted for implementation with existing extruders.

The foregoing and other aspects of the invention which will become apparent as the detailed description proceeds are achieved by a die assembly for producing an extrudate of layered composition, comprising: a preform having at least two passages therein, said passages extending to separate and distinct openings on a face of said preform; and a die plate maintained in operative communication with each said opening.

Additional aspects of the invention are obtained by a die assembly for producing an extrudate having a base layer of a first material and a cap layer of a second material thereover, comprising: a preform having a first passage therethrough for conveying said first material and a second passage therethrough for conveying said second material, said first and second passages respectively communicating with first and second openings on a surface of said preform; a first die plate having a die section in communication with said first opening; and a second die plate having a die section in communication with said second opening.

BRIEF DESCRIPTION OF DRAWINGS

For a complete understanding of the objects, techniques and structure of the invention reference should be had to the following detailed description and accompanying drawings wherein:

FIG. 5 is a top plan view of the preform die of FIG. 3;

FIG. 6 is a front elevational view of a final die plate according to the invention;

FIG. 7 is a side sectional view of the die plate of FIG. 6;

BEST MODE FOR CARRYING OUT THE INVENTION

Figure 3:
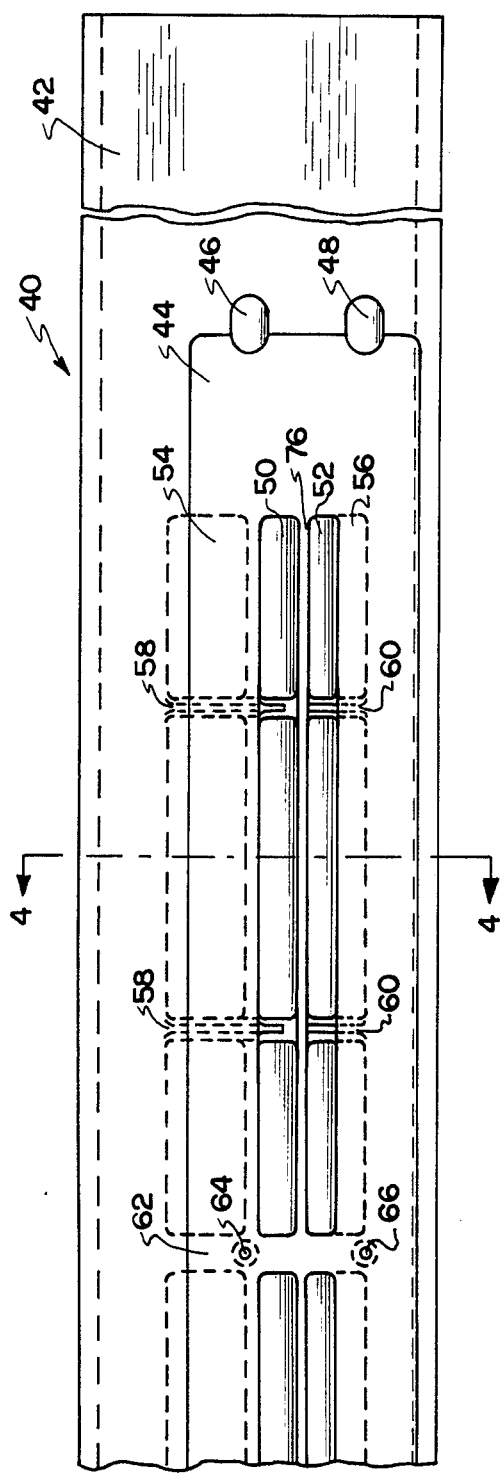
FIG. 3 is a front elevational view of a preform die according to the instant invention.
Figure 4:
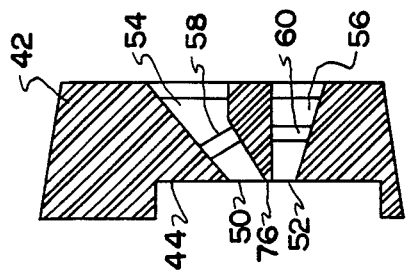
FIG. 4 is a sectional view of the preform die of FIG. 3 taken along the line 4—4.

Referring again to the drawings and more particularly FIGS. 3-5, it can be seen that a preform die according to the invention is designated generally by the numeral 40. The preform die 40 includes a housing 42 having recess 44 provided for receiving therein die plates to be discussed hereinafter. Cavities 46,48 are provided at the edge or periphery of the recess 44 to assist removal of the die plates.

An opening 50 is provided in the recess area 44 to pass therefrom the cap stock material. In like manner, an opening 52 is provided to pass therefrom the base stock material. A passage or cavity 54 communicates with the opening 50 for passing the cap stock material from an appropriate conduit through the housing 42. Similarly, the passage 56 receives the base stock material from an appropriate conduit, passes it through the housing 42 and from the opening 52. It should be observed that the openings 50,52 are substantially of rectangular configuration such that the configuration of the materials extruded therefrom can be controlled by the provision of die plates to be discussed hereinafter.

Ribs 58,60 may be provided in the passages 54,56 for purposes of strengthening the unit 40 and providing integrity thereto. A vertical partition 62, at approximately the midpoints of the openings 50,52 has therein threaded holes 64,66 to provide means for receiving top and bottom die plates as illustrated in FIG. 6.

A die plate 68 is provided with a counter sunk hole 70 therein for receiving a bolt or screw to achieve secured engagement with the partition 62 via either the threaded hole 64 or 66. The die plate shown in FIG. 6 is a blank, not having a die contour defined therein. The die blank 68 may be used for either a top die or a bottom die in the recessed area 44. It will be readily noted that the die formed from the blank 68 will readily be received in the recess area 44 and easily removed via the cavities 46,48.

Figure 8:
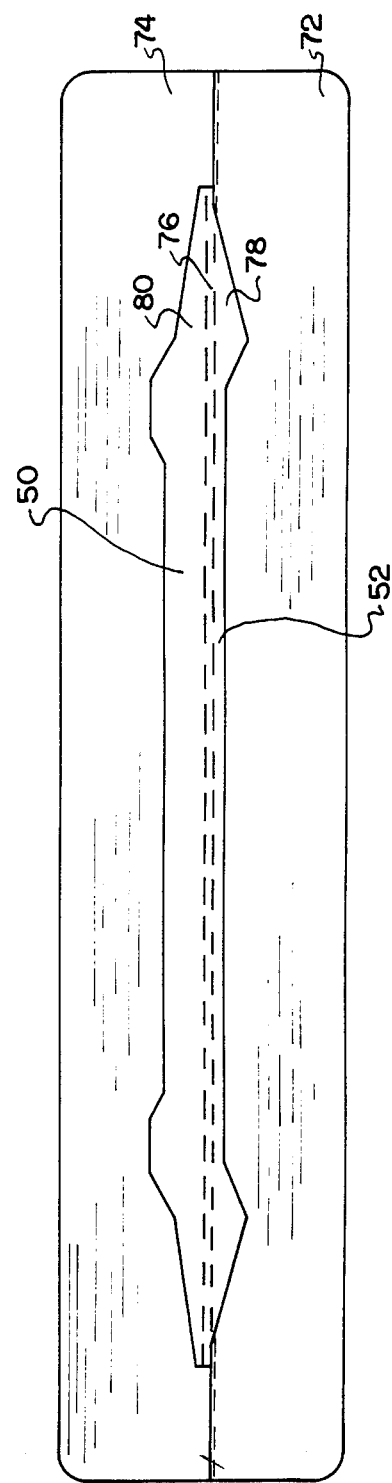
FIG. 8 is an illustrative view of the top and bottom die plates for generating a tire tread extrudate.

FIG. 8 illustratively shows a bottom die plate 72 and a top die plate 74, each have die sections removed therefrom. The die portion of the die plate 72 would communicate with the opening 52 in the recess area 44 as shown in FIG. 3. Similarly, the die portion of the top die plate 74 would communicate with the opening 50. A separating partition 76 extends between the openings 50,52 to keep separate the material extruded from the opening 50 and that from the opening 52 until it enters the die configured by the die portions of the die plate 72,74. With FIG. 8 being an illustrative view, the partition 76 is simply shown in phantom.

The die portion of the lower die plate 72 includes triangular shaped end portions 78 of increased volume over the major linear area of the die portion. In like manner, the ends of the die portions of the upper die plate 74 include trapezoidal and triangular areas 80 which are again of increased and then gradually decreasing area with respect to the major linear area of the die portion.

Figure 9:
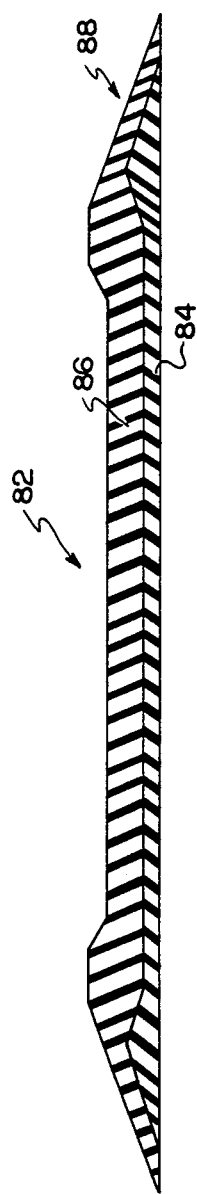
FIG. 9 is a cross-sectional view of the resultant extrudate from the dies of FIG. 8.

The base stock material passes through the opening 52, and through the die portion of the lower final die plate 72 while the cap stock material passes through the opening 50 and the die portion of the final upper die plate 74. The two materials are separated by the partition 76. These two stocks then mate as they pass from the plates 72,74 and are received by a conveyor belt in standard fashion. The conveyor belt, being flat in nature, assists in defining the resulting extrudate 82 to a cross-section as shown in FIG. 9. The base stock 84 and the cap stock 86 join together with a well defined junction as defined by the die portions of the die plates 72,74. It will be noted that the final extrudate 82 is, in cross-section, cumulative with respect to the die portions of the two die plates. As the base stock 84 and the cap stock 86 mate, the resultant extrudate 82 begins to relax, toward obtaining the posture shown in FIG. 9. The relaxation begins immediately upon the mating of the two layers and continues for a period of time dependent, in part on the relative gauges of the stocks 84,86, as well as their temperatures, and composition. Of course, the flat take-off belt receiving the extrudate aids in such relaxation.

It should therefore be apparent that the exterior geometric configuration of the extrudate 82, as well as the geometry of the junction between the two stocks is controlled and defined by the two final die plates.

The new die assembly of the invention attains unique control of this junction by controlling, through the final die plates 72,74 the upper profile of the cap stock and the lower profile of the base stock. With the cross section of the resultant extrudate 82 being cummulative with respect to the die portions of both die plates, control of these two profiles is sufficient to achieve ultimate control of the geometry of the extrudate 82, as a whole, as well as the junction between the base and cap stock layers 84,86.

Figures 1, 2:
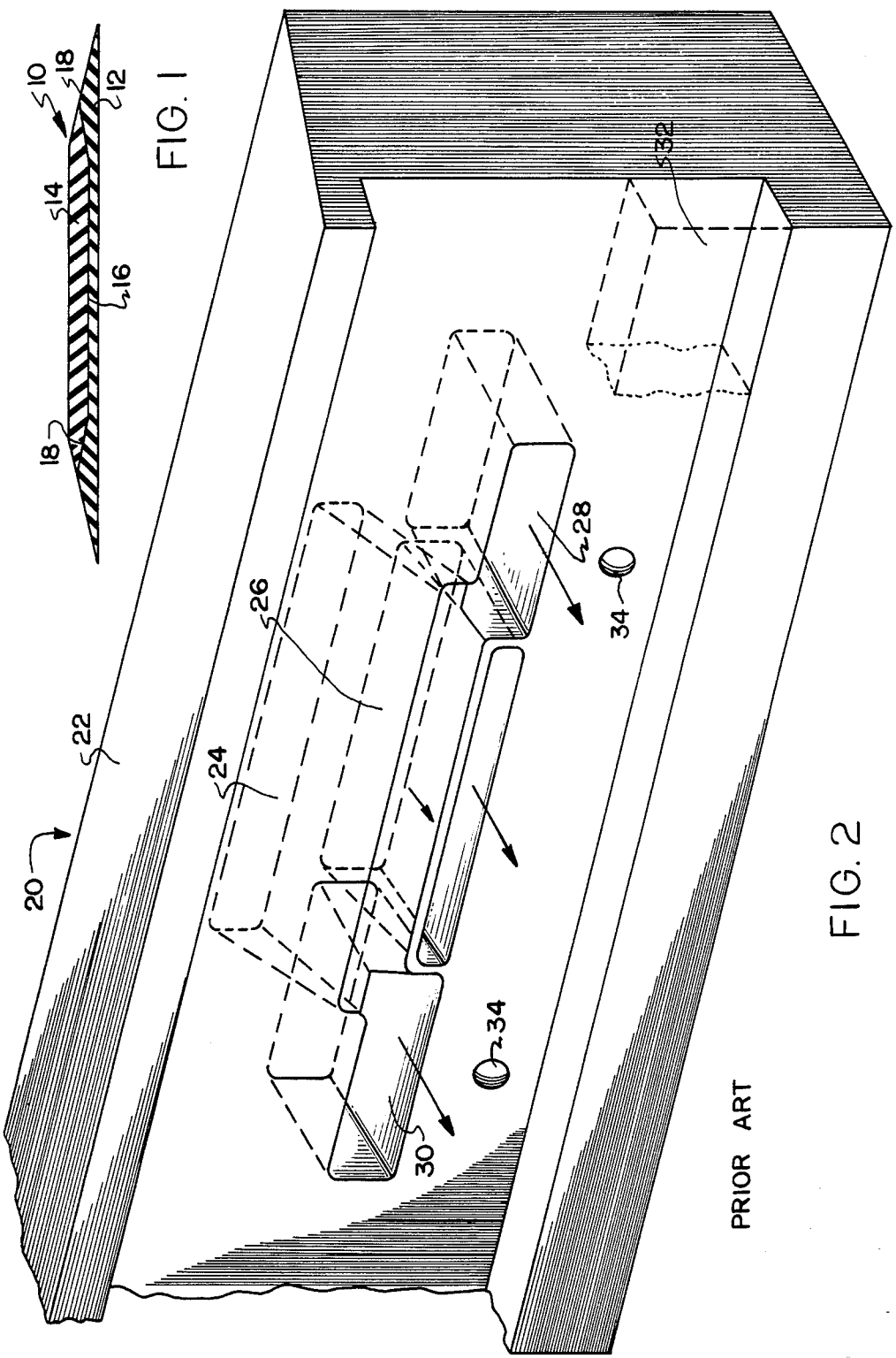
FIG. 1 is a cross-sectional view of a green tire tread extrudate.
FIG. 2 is a perspective view of a prior art die assembly.

It should further be understood and appreciated that control and regulation of the external geometry of the extrudate 82, as well as the junction between the two layers, can be readily controlled by appropriate design and application of die plates 72,74 to the recess 44 of the preform 42. To accommodate new tire specifications, only the final die plates 72,74 need be changed. The cavities, recesses, and overall structure of the preform 42 need not be modified. Significant savings in time and expense are thus obtained while achieving the benefit of controlling the junction of the two layers of the resulting extrudate. The die plates are easily made. Typically, such die plates are made from metal stock on the order of one half inch in thickness and the die portions are formed by simple cuts rather than the boring and machining required for the system of FIG. 2.

Thus it can be seen that the objects of the invention have been attained by the structure presented hereinabove. While in accordance with the patent statutes, only the best mode and preferred embodiment of the invention has been presented and described in detail, it is to be understood that the invention is not limited thereto or thereby. Accordingly, for an appreciation of the true scope and breadth of the invention reference should be had to the appended claims.

What is claimed is:

1. A die assembly for producing an extrudate of layered composition, comprising:
   a preform having at least two passages therein, said passages extending to separate and distinct vertically spaced openings on a face of said preform, said openings separated by a partition; and
   a separate die plate maintained in operative communication with each said opening, a first of said die plates communicating with an upper opening and controlling a top geometric configuration of a top layer of the extrudate, and a second of said die plates communicating with a lower opening and controlling a bottom geometric configuration of a bottom layer of the extrudate, said pair of die plates defining a single aperature encompassing portions of each of said pair of openings and a portion of said partition.

2. The die assembly according to claim 1 wherein said preform has a recessed area defining said face having said openings.

3. The die assembly according to claim 2 which further includes cavities at edges of said recessed area and extending beyond said recessed area.

4. The die assembly according to claim 1 wherein ribs are positioned with and extend across at least certain of said passages.

5. A die assembly for producing an extrudate having a base layer of a first material and a cap layer of a second material thereover, comprising:
   a preform having a first passage therethrough for conveying said first material and a second passage therethrough for conveying said second material, said first and second passages respectively communicating with first and second openings on a surface of said preform and separated by a partition therebetween;
   a first die plate having a die section in communication with said first opening;
   a second die plate having a die section in communication with said second opening; and
   wherein said die section of said second die plate defines a top geometric configuration of the cap layer, said die section of said first die plate defines a bottom geometric configuration for said base layer, and said top and bottom geometric configurations establish a junction line between the cap and base layers.

6. The die assembly according to claim 5 wherein said die sections are removed from peripheral portions of said die plates.

7. The die assembly according to claim 6 wherein said die sections of each of said first and second die plates communicate with each other across said partition.

8. The die assembly according to claim 7 wherein said die sections of said first and second die plates are additive, defining a resultant geometric configuration of the extrudate.

* * * * *